United States Patent
Zahora et al.

(10) Patent No.: US 8,587,165 B2
(45) Date of Patent: Nov. 19, 2013

(54) COOLED FAN MOTOR AND METHOD OF OPERATION

(75) Inventors: Joseph A. Zahora, Oakwood, OH (US); Harley J. Weldy, Covington, OH (US)

(73) Assignee: Dayton-Phoenix Group, Inc., Dayton, OH (US)

( * ) Notice: Subject to any disclaimer, the term of this patent is extended or adjusted under 35 U.S.C. 154(b) by 328 days.

(21) Appl. No.: 13/075,737

(22) Filed: Mar. 30, 2011

(65) Prior Publication Data

US 2012/0248908 A1    Oct. 4, 2012

(51) Int. Cl.
*H02K 9/00* (2006.01)

(52) U.S. Cl.
USPC ............. 310/67 R; 310/52; 310/58; 310/59; 310/62

(58) Field of Classification Search
USPC ................... 310/67 R, 52, 58, 59, 62
See application file for complete search history.

(56) References Cited

U.S. PATENT DOCUMENTS

| | | | |
|---|---|---|---|
| 2,196,952 A | 4/1940 | Bogaty | |
| 2,610,992 A | 9/1952 | Johns et al. | |
| 2,615,938 A | 10/1952 | Gynt | |
| 2,764,704 A | 9/1956 | Wolf | |
| 2,929,944 A | 3/1960 | Shewmon | |
| 3,296,475 A | 1/1967 | Parker | |
| 3,433,985 A | 3/1969 | Ireland et al. | |
| 3,496,398 A | 2/1970 | Calver | |
| 3,701,911 A | 10/1972 | Hallerback | |
| 4,689,507 A | 8/1987 | Baker et al. | |
| 4,839,547 A | 6/1989 | Lordo et al. | |
| 4,866,320 A | 9/1989 | Schulz | |
| 5,401,145 A | 3/1995 | Bleger et al. | |
| 5,469,608 A | 11/1995 | Biancalani | |
| 5,519,269 A | 5/1996 | Lindberg | |
| 5,780,946 A | 7/1998 | Nakamura et al. | |
| 5,796,190 A | 8/1998 | Takeda et al. | |
| 5,831,358 A | 11/1998 | Bobay | |
| 5,889,342 A | 3/1999 | Hasebe et al. | |
| 5,998,896 A | 12/1999 | Early et al. | |
| 6,107,708 A * | 8/2000 | Yamaguchi et al. | 310/58 |
| 6,188,153 B1 | 2/2001 | Hokanson | |
| 6,191,511 B1 | 2/2001 | Zysset | |
| 6,369,470 B1 | 4/2002 | Kylander et al. | |
| 6,459,179 B1 | 10/2002 | Lynch | |
| 6,828,700 B2 | 12/2004 | Cichetti, Sr. | |
| 6,933,633 B2 | 8/2005 | Kaneko et al. | |
| 6,982,506 B1 | 1/2006 | Johnsen | |
| 7,285,882 B2 | 10/2007 | Zhong | |
| 7,394,175 B2 | 7/2008 | McAuliffe et al. | |
| 7,545,642 B2 | 6/2009 | Uehara et al. | |
| 7,579,739 B2 | 8/2009 | Fujita et al. | |
| 7,582,994 B2 | 9/2009 | Noda | |
| 7,638,909 B2 | 12/2009 | Hattori et al. | |

(Continued)

*Primary Examiner* — Dang Le
(74) *Attorney, Agent, or Firm* — Thompson Hine, L.L.P.

(57) ABSTRACT

A cooled fan motor may include a tankhead, an elongate housing attached to the tankhead and, having at least one longitudinally extending groove, a shaft rotatably attached to the housing, a hub attached to the shaft, the hub having at least one opening therethrough and shaped to form a gap with the tankhead, a rotor attached to the hub, and a stator mounted on the housing such that the groove in the housing forms an air passage between the housing and the stator connecting the gap and the opening; whereby air external to the motor is able to enter through the gap, flow along the air passage and exit the motor through the opening in the hub, thereby cooling an interior of the motor.

24 Claims, 3 Drawing Sheets

(56) References Cited

U.S. PATENT DOCUMENTS

| | | |
|---|---|---|
| 7,660,110 B2 | 2/2010 | Vinson et al. |
| 7,692,341 B2 | 4/2010 | Lafontaine et al. |
| 7,705,495 B2 | 4/2010 | Alfermann et al. |
| 7,732,953 B2 | 6/2010 | Telakowski |
| 7,732,954 B2 | 6/2010 | Wiker et al. |
| 7,759,829 B2 | 7/2010 | Holter et al. |
| 7,777,375 B2 | 8/2010 | Pellegrino et al. |
| 8,179,005 B2 * | 5/2012 | Horng .............. 310/90 |
| 2002/0050748 A1 | 5/2002 | Ferguson |
| 2004/0000821 A1 | 1/2004 | Ciciliani et al. |
| 2004/0012294 A1 | 1/2004 | Rippel et al. |
| 2005/0093385 A1 | 5/2005 | Kuhn |
| 2006/0066155 A1 | 3/2006 | Matin et al. |
| 2006/0091743 A1 | 5/2006 | Iwasaki et al. |
| 2008/0111433 A1 | 5/2008 | Kreitzer et al. |
| 2008/0116754 A1 | 5/2008 | Pellegrino et al. |
| 2008/0143201 A1 | 6/2008 | Ramy et al. |
| 2008/0150375 A1 | 6/2008 | Shima |
| 2008/0169710 A1 | 7/2008 | Hattori et al. |
| 2008/0193275 A1 | 8/2008 | De Filippis et al. |
| 2009/0010771 A1 | 1/2009 | Vinson et al. |
| 2010/0019589 A1 | 1/2010 | Saban et al. |

* cited by examiner

COOLED FAN MOTOR AND METHOD OF OPERATION

BACKGROUND

This disclosure relates to electric motors and more particularly, to cooled electric motors for operation in environments having elevated temperatures.

Electric motors often must be placed in service in harsh environments. For example, electric motors, typically three-phase alternating current (AC) induction motors, may be used to drive exhaust or cooling fans for the diesel engine enclosures of diesel-electric locomotives. Electric cooling fans may be mounted on the roof of the diesel locomotive to draw ambient air through the radiator, where it absorbs heat from engine and power generation components and exhausts it upwardly. Such fans are thus mounted on the "hot side" of the cooling air that flows through the diesel engine enclosure, so that the exhaust fans typically operate in a stream of heated air from the radiator.

Operating such fan motors in a stream of heated air results in heat build-up within the fan motor enclosures themselves, causing temperatures within fan motor enclosures to reach as high as 190° C. Such elevated motor temperatures may cause the bearing lubricants to degrade rapidly, resulting in increased shear forces, changes in viscosity and elevated lubricant bleed and evaporative rates. Rapid lubricant degradation may cause failure of the rotor bearings after approximately 18-24 months of motor service time, significantly less than the desired motor service time of 72 months.

A desired operating range of motors in such applications is approximately 150° C.-160° C. before failure of the bearing lubricating grease. For every 10° C.-15° C. increase in bearing grease temperature, there is typically a reduction of one half-life of the bearings due to lubricant failure.

SUMMARY

The disclosure is directed to a cooled fan motor in which air external to the motor may enter the motor enclosure and flow in an area adjacent the motor bearings in order to cool the motor bearings and lubricant and thereby extend bearing life, which extends the operating life of the motor. In one aspect, a cooled fan motor may include a housing adapted to be attached to a support structure, such as a tankhead, a shaft rotatably attached to the housing, a hub attached to the shaft, a rotor attached to the hub and a stator mounted on the housing. The housing may have at least one longitudinally extending groove, and preferably a plurality of grooves formed in and spaced about an outer periphery of the housing. The stator may be mounted on the housing such that the grooves form air passages between the housing and stator.

The hub may be shaped to form an annular gap with the support structure and may include an opening therethrough, preferably a plurality of openings therethrough. The openings may be positioned on the hub at a location opposite the gap. In one aspect, the hub may include a plurality of radially extending fan blades. The cooled fan motor thus may include a cooling air path so that air external to the motor and hub may enter through the gap between the hub and support structure, flow along the grooves formed in the housing and exit the hub through the hub openings. In one aspect, the blades may be positioned on the hub so that the gap between the hub and support structure is downstream of the blades and the hub openings are located upstream of the blades.

When the stator is energized, the rotor and hub rotate, causing the blades to move air around the hub. This air movement may cause ambient air to enter the gap between the hub and support structure, flow along the grooves between the housing and stator, and exit the openings in the hub. Thus, cooling air may flow through the motor in a direction opposite that of external air flow.

In one aspect, the housing may include bearings that support the shaft. The bearings may be positioned adjacent the grooves so that cooling air flow may cool the bearings and bearing lubricant, thus prolonging the operating life of the bearings and motor.

Other objects and advantages of the disclosed cooled fan motor and method of operation will be apparent from the following description, the accompanying drawings and the appended claims.

DETAILED DESCRIPTION

Figure 1:
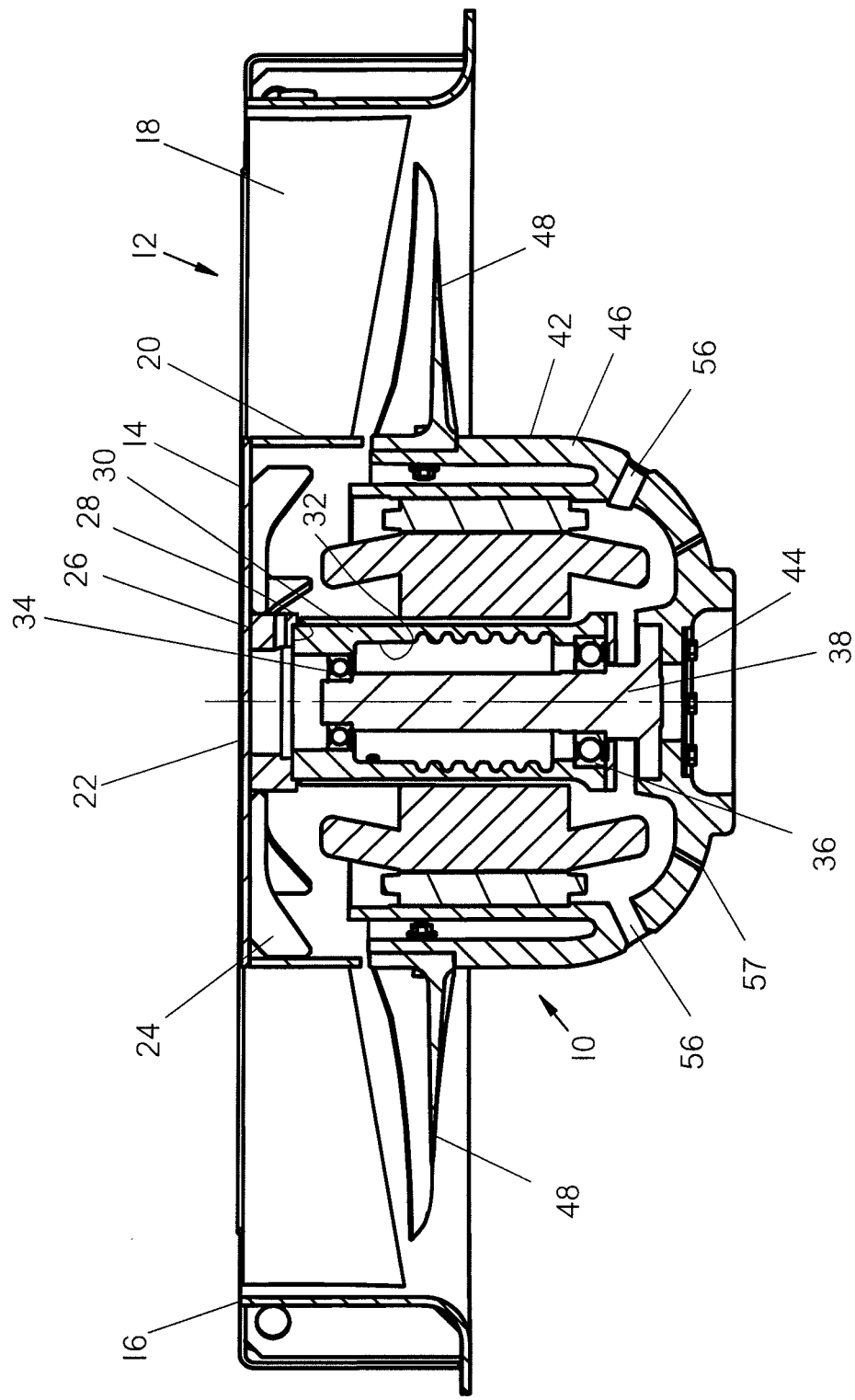
FIG. 1 is a side elevation in section of the disclosed cooled fan motor, shown incorporated in an exhaust fan of a diesel-electric locomotive.

As shown in FIG. 1, the cooled fan motor, generally designated 10, is shown incorporated in an exhaust fan, generally designated 12 of a type that may be suitable for use as an exhaust fan of a diesel-electric locomotive. The motor 10 is shown schematically as a three-phase, asynchronous, alternating current (AC) motor. However, it is within the scope of this invention to employ this design with other types of electric motors.

The fan 12 may include a tankhead 14 having an annular outer support rim 16, adapted to be mounted on the roof of a locomotive engine enclosure (not shown) or other support structure, a plurality of vanes 18 attached to and extending radially inwardly from the support rim 16, and an inner annular wall 20 supported by the vanes 18. The inner annular wall 20 may be enclosed on its upper surface by an end plate 22 and may be strengthened by ribs 24 welded to the end plate 22 and wall 20. The ribs 24 may support an annular mounting boss 26 having a stepped recess 28 (see also FIG. 3). Power cables (not shown) for energizing the motor 10 are connected to a source of three-phase power and may extend through tubular conduit (not shown) that is be attached to a selected one of the vanes 18 and passes through the annular wall 20 to be connected to the motor.

Figure 3:
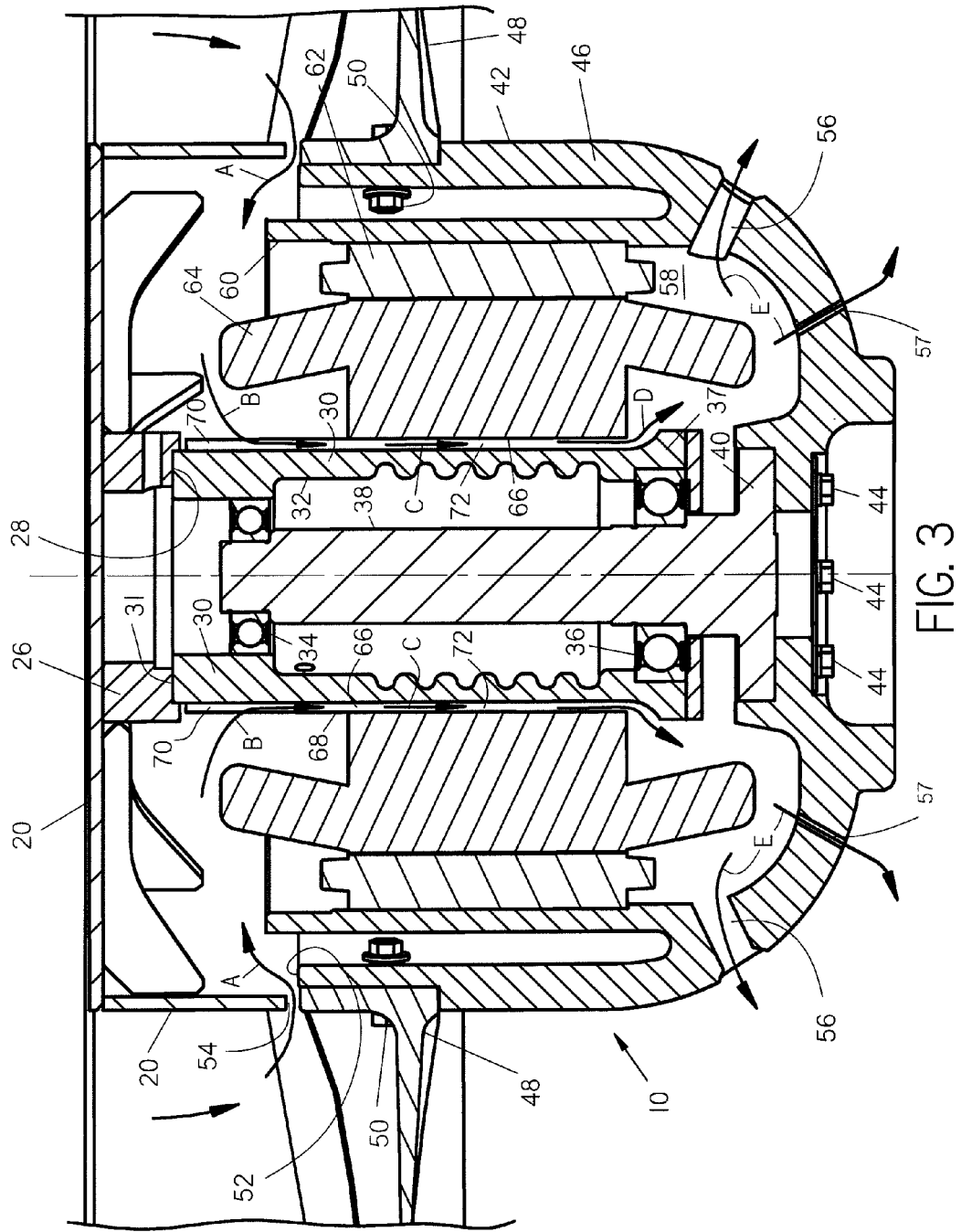
FIG. 3 is a detail side elevation in section of the fan motor of FIG. 1.

As shown in FIGS. 1 and 3, the motor 10 may include an annular bearing housing 30 having an upper end 31 shaped to fit within the stepped recess 28 and may be bolted to the mounting boss 26 by bolts (not shown). The bearing housing 30 may be generally cylindrical in shape, having an inner cylindrical surface 32. The bearing housing 30 may include an upper bearing 34, mounted within the interior of the bearing housing adjacent an upper end thereof, and lower or drive end bearings 36, also mounted within the interior of the bearing housing 30 adjacent a slightly enlarged lower end 37 thereof. Preferably, the bearings 34 and 36 are heat shrunk and slip fitted into the interior of the bearing housing. Upper and lower bearings 34, 36 are shown as sets of lubricated ball bearings. However, it is within the scope of the invention to employ other types of rolling element bearings, such as roller bearings or tapered roller bearings, as well as journal bearings or fluid bearings.

A central, generally cylindrical shaft 38 may be mounted within the bearing housing 30 and may be rotatably connected thereto at upper and lower drive end bearings 34, 36, respectively. The central shaft 38 may be concentric with the bearing housing 30. The central shaft 38 may protrude from a lower end of the bearing housing 30 and terminate in a disc-shaped head 40.

A hub, generally designated 42, may be attached to the central shaft 38 by bolts 44 that may be threaded into the head 40. The hub 42 may include a cup-shaped body 46 and a plurality of radially extending fan blades 48 attached to the body by bolts 50. As best shown in FIG. 3, the hub body 46 may terminate in an annular upper edge 52 that forms an annular gap 54 with the inner annular wall 20 of the tankhead 12. In the embodiment shown, the gap is about ⅜ inches. However, gaps of greater or lesser size may be employed without departing from the scope of the invention.

The lower end of the hub body 46 opposite the gap 54 may include a plurality of openings 56 and drain holes 57 that connect an interior portion 58 of the hub body 46 to the ambient. Although FIGS. 1 and 3 show the hub body 46 having two openings 56 on opposite sides of the hub body 46, the hub body may have a single opening 56, or as many as six or more openings spaced generally evenly about the periphery of the hub, without departing from the scope of the invention. Similarly, while FIGS. 1 and 3 show the hub body 46 as having a single drain hole 57, the hub body may have several drain holes spaced evenly about the hub periphery without departing from the scope of the invention. The drain holes 57 preferably are round in cross section, but may be any shape in cross section, or a variety of shapes, without departing from the scope of the invention.

The openings 56 preferably are elongate in shape, approximately 1.00"×4.00" in a circumferential direction. However, the openings 56 may be any shape or size, or a variety of shapes and sizes, such as generally circular or polygonal, without departing from the scope of the invention.

The hub body 46 includes an inner, cylindrical wall 60. A rotor 62, generally cylindrical in shape and part of the AC motor, is mounted on the inner wall 60, preferably by press fitting. The AC motor 10 may include a complementary stator 64, mounted on the bearing housing 30 and concentric with the rotor 62. The stator 64 includes a stator core having a cylindrical inner wall 66. There preferably is minimal clearance between the outer diameter of the stator 64 and the inner diameter of the rotor 62 in order to maximize the torque generated by the motor. However, such minimal clearance does not permit air to circulate between the stator 64 and rotor 62 within the interior 58 of the motor 10.

Figure 2:
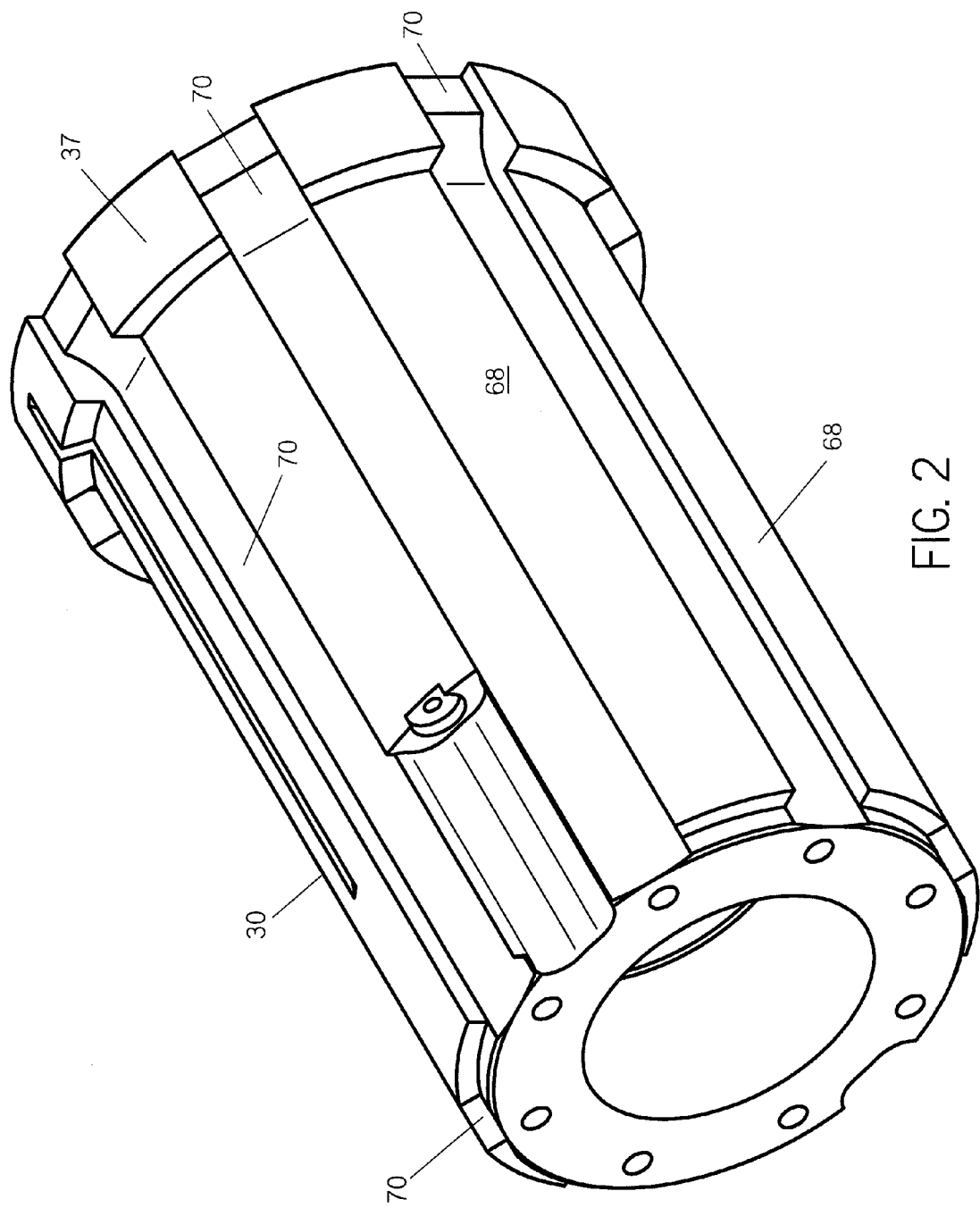
FIG. 2 is a perspective view of a bearing housing of the cooled fan motor of FIG. 1.

As best shown in FIG. 2, the bearing housing 30 may include an outer surface 68 having a plurality of longitudinally extending grooves 70 formed thereon. The grooves 70 preferably extend the entire length of the bearing housing 30, including the enlarged lower end 37. The bearing housing 30 shown in the figures includes eight grooves 70, each approximately 1.25 inches wide and 0.340 inches deep. However, it is within the scope of the invention to provide a greater or fewer number of grooves 70, or to vary the width or depth of the grooves, or to provide grooves of varied widths and depths.

As best shown in FIG. 3, when the stator 64 is mounted on the bearing housing 30, the inner cylindrical surface 66 of the stator engages the outer surface 68 of the bearing housing, and the grooves 70 may form air passages 72 with the inner surface 66.

In operation, the windings of the stator 64 may be energized by a source of three-phase electrical power (not shown), causing the rotor 62 and hub 42 to rotate relative to the stator. The rotation of the hub 42 causes the blades 48 to displace ambient air upwardly, as shown in FIGS. 1 and 3. The movement of air causes ambient air to enter through the annular gap 54 between the wall 20 and end of the hub body 52, as shown by arrow A. Ambient air entering the interior 58 of the hub may then flow downwardly, as indicated by arrows B and C, along the air passages 72 formed by the cooperation of the grooves 70 and inner wall 66 of the stator 64. Then, as indicated by arrows D, the air flows past the drive end bearing 36 and end turns of the stator 64, and outwardly through openings 56 and drain holes 57 in the hub body 46, as indicated by arrows E.

Continued operation of the fan 10 causes ambient air to continue to flow in the direction of arrows, A, B, C, D, E, thus cooling the interior 58 of the hub body 46, and in particular, cooling drive end bearing 36 and in addition, upper bearing 34 and upper and lower end turns of the stator 64. Thus, by cooling the bearings 34, 36, the temperature of the lubricants in the bearings is lowered, thereby extending the useful life of the lubricant and bearings. Further, the overall service life of the motor 10 is extended relative to a motor not having the interior ventilation capabilities of the disclosed motor.

While the forms of apparatus and methods disclosed herein may constitute preferred embodiments of the invention, it is to be understood that other forms of apparatus and components may be employed without departing from the scope of the invention.

What is claimed is:

1. A cooled fan motor comprising:
   a tankhead;
   an elongate housing attached to said tankhead, said housing having at least one longitudinally extending groove;
   a shaft rotatably attached to said housing;
   a hub attached to said shaft for rotation relative to the tankhead, said hub having at least one opening therethrough and shaped to form a gap with said tankhead;
   a rotor attached to said hub;
   a stator mounted on said housing such that said groove forms an air passage between said housing and said stator connecting said gap and said opening; and
   said hub including a plurality of radially extending fan blades, said fan blades positioned such that said gap is downstream of said fan blades, and said at least one opening is upstream of said fan blades;
   whereby rotation of said hub by said rotor causes said fan blades to displace ambient air such that said ambient air enters an interior of said hub through said gap downstream of said fan blades, flows from said gap along said air passage and exits said hub through said at least one opening upstream of said fan blades, thereby cooling an interior of said motor.

2. The fan motor of claim 1, wherein said housing includes bearings rotatably supporting said shaft, and wherein at least one of said bearings can be cooled by air flowing in said groove during operation of said fan motor.

3. The fan motor of claim 2, wherein said bearings include a drive end bearing located at an end of said housing adjacent said hub.

4. The fan motor of claim 3, wherein said stator is concentric with and positioned radially inwardly of said rotor.

5. The fan motor of claim 1, wherein said housing is substantially cylindrical, having a central bore shaped to receive said shaft.

6. The fan motor of claim 5, wherein said stator includes a substantially cylindrical central passage shaped to receive said housing therethrough.

7. The fan motor of claim 6, wherein said housing includes a plurality of grooves spaced about an outer periphery thereof.

8. The fan motor of claim 7, wherein said at least one opening includes a plurality of openings spaced about an end of said hub opposite said gap.

9. The fan motor of claim 8, wherein said hub is generally cylindrical in shape and includes a substantially closed end opposite said tankhead.

10. The fan motor of claim 8, wherein said plurality of openings is positioned on said hub adjacent said closed end.

11. A cooled fan motor comprising:
an elongate housing adapted to be attached to a tankhead, said housing having at least one longitudinally extending groove;
a shaft rotatably attached to said housing;
a hub attached to said shaft, said hub having at least one opening therethrough and shaped to form a gap with a tankhead attached to said housing;
a rotor attached to said hub;
a stator mounted on said housing such that said groove forms an air passage between said housing and said stator connecting said gap and said opening; and
said hub including a plurality of radially extending fan blades, said fan blades positioned such that said gap is downstream of said fan blades, and said at least one opening is upstream of said fan blades;
whereby rotation of said hub by said rotor causes said fan blades to displace ambient air such that said ambient air enters an interior of said hub through said gap, downstream of said fan blades, flows from said gap along said air passage and exits said hub through said at least one opening upstream of said fan blades, thereby cooling an interior of said motor.

12. The fan motor of claim 11, wherein said housing includes bearings rotatably supporting said shaft, and wherein at least one of said bearings can be cooled by air flowing in said groove during operation of said fan motor.

13. The fan motor of claim 12, wherein said bearings include a drive end bearing located at an end of said housing adjacent said hub.

14. The fan motor of claim 13, wherein said stator is concentric with and positioned radially inwardly of said rotor.

15. The fan motor of claim 11, wherein said housing is substantially cylindrical, having a central bore shaped to receive said shaft.

16. The fan motor of claim 14, wherein said stator includes a substantially cylindrical central passage shaped to receive said housing therethrough.

17. The fan motor of claim 16, wherein said at least one groove includes a plurality of grooves spaced about an outer periphery of said housing.

18. The fan motor of claim 17, wherein said at least one opening includes a plurality of openings spaced about an end of said housing opposite said gap.

19. The fan motor of claim 18, wherein said hub is generally cylindrical in shape and includes a substantially closed end.

20. The fan motor of claim 19, wherein said plurality of openings is positioned on said hub adjacent said substantially closed end.

21. A cooled fan motor comprising:
a tankhead having an annular wall;
a generally cylindrical, elongate housing attached to said tankhead, said housing having a plurality of longitudinally extending grooves extending about an outer periphery thereof, said housing including bearings attached to an inner surface thereof;
a shaft rotatably mounted on said bearings within said housing;
a hub attached to said shaft, said hub shaped to form an annular gap with said annular wall of said tankhead and having a plurality of openings therethrough at an end thereof opposite said tankhead, said hub including a plurality of blades extending radially outwardly therefrom and positioned such that said plurality of openings are upstream of said plurality of blades and said annular gap is downstream of said plurality of blades;
a rotor attached to an inner surface of said hub; and
a stator mounted on said housing such that said grooves form air passages between said housing and said stator connecting said gap and said opening;
whereby rotation of said hub by said rotor causes said fan blades to displace ambient air such that said ambient air enters an interior of said hub through said gap downstream of said fan blades, flows from said gap along said plurality of air passages and exit said housing through said openings in said hub, thereby cooling said bearings.

22. A method of operating a cooled fan motor, the method comprising:
providing a tankhead;
providing an elongate housing attached to said tankhead, said housing having at least one longitudinally extending groove;
providing a shaft rotatably attached to said housing;
providing a hub attached to said shaft, said hub having at least one opening therethrough and shaped to form a gap with said tankhead, said hub including a plurality of radially extending fan blades, said fan blades positioned such that said gap is downstream of said fan blades, and said at least one opening is upstream of said fan blades;
providing a rotor attached to said hub;
providing a stator mounted on said housing such that said groove forms an air passage between said housing and said stator connecting said gap and said opening; and
rotating said hub to cause said fan blades to displace ambient air such that said ambient air enters an interior of said hub through said gap downstream of said fan blades, flows from said gap along said air passage and exits said hub through said at least one opening upstream of said fan blades, thereby cooling an interior of said motor in an area substantially adjacent said housing.

23. The method of claim 22, wherein said rotating said hub includes energizing said stator.

24. A cooled fan motor comprising:
a tankhead;
an elongate housing attached to said tankhead, said housing having at least one longitudinally extending groove;
a shaft rotatably attached to said housing;
a hub attached to said shaft, said hub having at least one opening therethrough and shaped to form a gap with said tankhead;
a rotor attached to said hub;
a stator mounted on said housing such that said groove forms an air passage between said housing and said stator connecting said gap and said opening; and
said hub including a plurality of fan blades extending radially therefrom, said plurality of blades positioned such that said gap is downstream of said fan blades, and said at least one opening is positioned upstream of said fan blades;
whereby rotation of said hub by said rotor causes said fan blades to displace ambient air such that said ambient air enters an interior of said hub through said gap, flows from said gap along said air passage and exits said hub through said at least one opening, thereby cooling an interior of said motor.

* * * * *